United States Patent
Young et al.

(10) Patent No.: US 8,204,962 B2
(45) Date of Patent: *Jun. 19, 2012

(54) METHOD FOR QUEUED OVERLAP TRANSFER OF FILES

(75) Inventors: Corey Young, Provo, UT (US); David Kovanen, Browns Point, WA (US); Joseph Fullmer, Orem, UT (US)

(73) Assignee: Rose Blush Software LLC, Los Altos, CA (US)

( * ) Notice: Subject to any disclaimer, the term of this patent is extended or adjusted under 35 U.S.C. 154(b) by 866 days.

This patent is subject to a terminal disclaimer.

(21) Appl. No.: 11/362,942

(22) Filed: Feb. 28, 2006

(65) Prior Publication Data

US 2006/0168312 A1    Jul. 27, 2006

Related U.S. Application Data

(63) Continuation of application No. 09/691,091, filed on Oct. 18, 2000, now Pat. No. 7,024,465.

(60) Provisional application No. 60/160,242, filed on Oct. 18, 1999.

(51) Int. Cl.
*G06F 15/16* (2006.01)

(52) U.S. Cl. ............... 709/219; 709/232; 709/235

(58) Field of Classification Search .................. 709/235, 709/232, 219
See application file for complete search history.

(56) References Cited

U.S. PATENT DOCUMENTS

| | | | |
|---|---|---|---|
| 5,557,541 A | 9/1996 | Schulhof et al. | |
| 5,616,876 A | 4/1997 | Cluts | |
| 5,715,403 A | 2/1998 | Stefik | |
| 5,802,292 A | 9/1998 | Mogul | |
| 5,864,868 A | 1/1999 | Contois | |
| 5,864,870 A * | 1/1999 | Guck | 707/104.1 |
| 5,946,682 A * | 8/1999 | Wolfe | 707/5 |
| 5,953,005 A * | 9/1999 | Liu | 715/243 |
| 5,978,841 A | 11/1999 | Berger | |
| 5,991,306 A | 11/1999 | Burns et al. | |

(Continued)

FOREIGN PATENT DOCUMENTS

WO    WO 00/59228    10/2000

(Continued)

OTHER PUBLICATIONS

McCandless, Michael, "The MP3 revolution," Internet Services, May/Jun. 1999.

(Continued)

*Primary Examiner* — Djenane Bayard
*Assistant Examiner* — Umar Cheema
(74) *Attorney, Agent, or Firm* — Sterne, Kessler, Goldstein & Fox PLLC

(57) ABSTRACT

It is therefore an object of the invention to provide a system and method for prequeuing of files predicted to be desired by a user, through a telecommunications link, into a local cache, based on a list, wherein the prequeuing system is responsive to any change in the sequence of user review, such that predicted latencies for sequential file review from any given starting point are minimized. A system and method for reducing latency in a sequential record browser are provided, for defining a sequential list of records; selecting a record from the list for review; downloading the selected record, and records sequentially thereafter until interrupted; interrupting the downloading by selecting a non-sequential record; and downloading the a non-sequential record and records sequentially thereafter until interrupted.

15 Claims, 3 Drawing Sheets

U.S. PATENT DOCUMENTS

| | | | | |
|---|---|---|---|---|
| 5,996,015 | A | * | 11/1999 | Day et al. .................... 709/226 |
| 6,016,520 | A | | 1/2000 | Facq et al. |
| 6,026,439 | A | | 2/2000 | Chowdhury et al. |
| 6,085,193 | A | | 7/2000 | Malkin et al. |
| 6,085,226 | A | | 7/2000 | Horvitz |
| 6,098,064 | A | | 8/2000 | Pirolli et al. |
| 6,098,096 | A | | 8/2000 | Tsirigotis et al. |
| 6,108,686 | A | | 8/2000 | Williams, Jr. |
| 6,182,133 | B1 | | 1/2001 | Horvitz |
| 6,282,548 | B1 | | 8/2001 | Burner et al. |
| 6,301,584 | B1 | * | 10/2001 | Ranger ..................... 707/103 R |
| 6,324,182 | B1 | * | 11/2001 | Burns et al. .................. 370/429 |
| 6,370,527 | B1 | * | 4/2002 | Singhal ............................ 1/1 |
| 6,385,596 | B1 | * | 5/2002 | Wiser et al. .................... 705/51 |
| 6,385,641 | B1 | | 5/2002 | Jiang et al. |
| 6,427,149 | B1 | * | 7/2002 | Rodriguez et al. .............. 707/10 |
| 6,446,080 | B1 | | 9/2002 | Van Ryzin et al. |
| 6,452,609 | B1 | | 9/2002 | Katinsky et al. |
| 6,470,427 | B1 | | 10/2002 | Arimilli et al. |
| 6,535,878 | B1 | * | 3/2003 | Guedalia et al. ................ 707/8 |
| 6,587,837 | B1 | | 7/2003 | Spagna et al. |
| 6,604,108 | B1 | * | 8/2003 | Nitahara .................... 707/102 |
| 6,718,454 | B1 | | 4/2004 | Ebner et al. |
| 6,766,357 | B1 | * | 7/2004 | Fandozzi .................... 709/213 |
| 6,842,758 | B1 | * | 1/2005 | Bogrett ..................... 707/103 R |

FOREIGN PATENT DOCUMENTS

WO        WO 01/93161 A1    12/2001

OTHER PUBLICATIONS

Chang et al. "An Effective and Efficient Traffic Smoothing Scheme for Delivery of Online VBR Media Streams," IEEE Jun. 1999.

Jadav et al., "Caching of large database objects in Web servers" Research Issues in Data Engineering, 1997, Proceedings, Seventh International Workshop on, Apr. 7-8, 1997, pp. 10-19.

Wu et al., "Virtual proxy servers for WWW and intelligent agents on the Internet" System Sciences, 1997, Proceedings of the Thirteenth Hawaii International Conference on, vol. 4, Jan. 7-10, 1997, pp. 200-209.

Hsu et al., "A Performance Study of Instruction Cache Prefetching Methods" IEEE Transactions on Computers, vol. 47, No. 5, May 1998, pp. 497-508.

Jiang et al., "An adaptive network prefetch scheme," Selected Areas in communications, IEEE Journal on, vol. 16, Issue: 3, Apr. 1998, pp. 358-368.

Hussain et al., "Intelligent prefetching at a proxy server," Electrical and Computer Engineering, 2000 Canadian conference on, vol. 1, Mar. 7-10, 2000, pp. 201-211 vol. 1.

Gingras et al., "Smart multimedia file objects," Internet Applications, 1999, IEEE Workshop on, Jul. 26-27, 1999, pp. 96-102.

* cited by examiner

METHOD FOR QUEUED OVERLAP TRANSFER OF FILES

CROSS-REFERENCE TO RELATED APPLICATIONS

This application is a continuation of U.S. application Ser. No. 09/691,091, titled "Method For Queued Overlap Transfer of Files," filed Oct. 18, 2000, which claims the benefit of U.S. Provisional Application No. 60/160,242, titled "Method For Queued Overlap Transfer of Files," filed Oct. 18, 1999, which are herein incorporated by reference in their entireties.

FIELD OF THE INVENTION

The invention relates generally to the field of intelligent caching systems, and more particularly to a system and method for the transfer of files from a server machine to a client machine using an arbitrary transfer protocol, in which files are transferred in the background during the standard operation of a client-side software application.

BACKGROUND OF THE INVENTION

Many computer software programs provide functionality that allows a user to transfer files between a client and a server computer. These software programs typically provide such functionality in a straightforward fashion, allowing the user to select those files they want to transfer, and whether or not the files are to be sent to the server computer, or sent from the server computer to the client computer. One example of a typical software program that provides such functionality is a File Transfer Protocol (FTP) program. The user can typically specify which FTP server they would like to connect to, and upon being connected, transfer files back and forth between the server and the client.

While some software programs provide file transfer functionality directly to the user, there are others that perform file transfers in the background. These types of programs typically provide some other type of functionality, and the transfer of files is only a necessary part of providing the other functionality. An example of such a program is a so-called Web browser, examples of which include Microsoft Internet Explorer and Netscape Navigator. The primary purpose of a Web browser is to allow the user to connect to other computers find view information provided in Hypertext Mark-up Language (HTML). Although the user has no explicit control over the transfer of files, the Web browser must request from the server those files it needs to display the information the user wants to see. All transfer of files takes place in the background. The user is typically oblivious to exactly what files are being transferred and in what order. Further, the user typically does not have control over this. Finally, typical web browsers load only those objects specified in the HTML document.

So called Web accelerators may define a further level of functionality, by preloading Web pages or other objects referenced on an active HTML document, and/or refreshing preferred Web pages previously visited and likely to be revisited. While some Web accelerators may provide a degree of user control, these rarely understand the content of the document and the inferred relationship between various documents within a set.

Whether files are transferred because of direct control of the user, or whether they are transferred in behalf of the user to provide additional functionality, there are several limitations to this approach. Firstly, the user typically does not have control over the order in which the files are transferred. Secondly, if the server computer must charge for the transfer of files, there is no way for the user to specify how many files are to be transferred. And thirdly, files are not automatically queued for transfer in an intelligent manner as to allow the user to make use of what he or she wants to in an organized fashion.

SUMMARY AND OBJECTS OF THE INVENTION

The present invention solves these issues by queuing up for the user files in an organized, pre-determined manner. The user is allowed to specify the number of files to be queued for transfer, and how many files the application software should "look ahead."

These functions are preferably integrated into a browser application, or as a plug-in or extension to the browser.

The invention can also be embodied as computer-executable program code functions on a computer readable medium. As used herein, a computer readable medium is any data storage device that can store data which can thereafter be read by a computer system. Examples of the computer readable medium include read-only memory, random-access memory, CD-ROMs, DVDs, magnetic tape, and optical data storage devices.

Because the process occurs predictably, the user may gain a sense of which actions have a high latency penalty and which are efficient.

Where an accounting system accounts for user "consumption" of documents, it is possible to contingently download documents in compressed format, and only account for their usage (or provide the appropriate decryption key) only when actually consumed (e.g., viewed, printed, analyzed, etc.). This system presumes, however, that the cost of document retrieval and transmission by the server is but a small operating cost, and that the user is willing to pay for this convenience based on documents or objects actually "consumed". This is particularly the case in the event of copyright content wherein an author or publisher must be compensated for the document.

On the other hand, where the document retrieval and transmission is substantial as compared to the overall value of the transaction, then it might be presumed that the cost is low, since database and telecommunication systems at present are quite efficient.

Thus, the user in that case might be very willing to pay for contingently downloaded content, even if not "consumed". This is particularly the case where the system employs the Internet to transmit relatively low-valued data records. By charging for such contingent downloads, the burden on the server may be equitably distributed, and abuses of the finite resources are discouraged.

Further, by caching documents locally which are expected to be requested or required, the burden on the server may be more evenly distributed, permitting the average load on the server to be closer to the peak performance. Likewise, a user may predefine a strategy, communicating with the server over a limited bandwidth link, with the negative impacts of server and communications latency minimized, assuming that the user must manually review and analyze the documents after downloading.

Typically, however, the caching strategy may be relatively simple; documents on a hit list are downloaded sequentially, using the particular view format presently invoked to define the format of the records to download. If the format is changed while viewing a document, later documents in the list are cached in the new format, while prior documents are not, until the remainder of the list is exhausted. Thus, a linear review of the list is presumed. If this linear review is incorrect, the general strategy is for the user to apply a different sort criterion or criteria to the list so that it better represents the desired order of viewing.

Upon connecting to a server computer, a list of files or documents is presented to the user. In an preferred embodiment, this list of files or documents would be presented in a list and the user would be able to select which file or document they want to view or want transferred. Typically, upon selecting the item for view or transfer, the present invention requests from the server computer that it send the requested item.

Typically when a user is viewing such a list of items, he will want to view them sequentially. Thus it becomes important to decrease the time a user must wait when selecting the next item in the list for view or transfer.

The present invention provides a queuing mechanism whereby list items are queued for transfer sequentially ahead of the user.

Because responsiveness to the user is important, the present invention allows for the cancellation of queued items, and allows for the continuation of queuing to take place in the case where the user skips several items in the list when making another request. In this process, the present invention cancels all requested items, requests the newly selected item, then continues by requesting additional items sequentially in the list after the newly selected item.

The present invention assumes that the user may be charged for items transferred by the server to the client. Thus, the present invention provides a setting that allows the user to specify whether or not all items in the list are transferred in advance of the user, or how many items are to be queued in advance of where he/she is currently viewing or transferring. Typically if the user has specified that they want all of the files transferred, this can minimize connect time. If the user specifies some low value for this setting, then the connection time can be elongated, but charges for each item can be minimized.

The present invention assumes that the user may be charged for the time spent while connected to the server computer. Thus, the present invention provides support for settings that allow the user to specify the granularity or quality of the item to be sent in return. For example, if the items being transferred are images, the present invention provides support for a setting that dictates what resolution of image should be sent in return. The provision for these settings not only provides potential to decrease connect time, but also allow for the present invention to be more responsive in the cases where the user has selected less granularity.

The present invention allows the types of items being transferred to be arbitrary. That is to say, the items may be image files, text files, or any other type of file format. This file format is typically specific to the particular application. In the case of the preferred embodiment, the files transferred are modified Group 4 compressed TIFF images. Although Group 4 compressed TIFF images are used in the preferred embodiment, the choice of file format again is arbitrary and such a preferred embodiment could have been implemented using another image format, or a multiplicity of files providing the same information contained in the preferred embodiment's TIFF.

The present invention allows the user to specify the number of queue requests to be sent to the server at any one given time. This setting is different from the setting previously mentioned, responsible for allowing the user to specify the number of items queued in advance of the currently selected item. Typically on a high speed connection, the server is able to send to the client the queued files more quickly. Thus if the user decides to skip a number of items in the list when making a request, there are less queued files to be canceled. Because this setting allows the user to specify the number of queue requests to be sent to the server at any one given time, the user can adjust this setting to accommodate a slower or faster connection. If the user has a slower connection, then he/she will want to specify a smaller value for this setting so that less items have to be cancelled.

It is therefore an object of the invention to provide a system and method for prequeuing of files predicted to be desired by a user, through a telecommunications link, into a local cache, based on a list, wherein the prequeuing system is responsive to any change in the sequence of user review, such that predicted latencies for sequential file review from any given starting point are minimized.

The present invention also allows for an automated optimization strategy based on the throughput of the connection between the server and client, the apparent strategy for review of records by the user, the cost of the record downloads, the cost of on-line time, the value of the user's time, burden on the server, and/or possibly other factors. Using standard optimization techniques, including linear optimization, collaborative filtering, fuzzy logic, neural networks and the like, it is possible to determine an optimal strategy that may be implemented. If conditions change, the strategy may be adaptive to these conditions and respond accordingly. Thus, while a relatively simple linear strategy of caching sequential records after the active record according to a list has been discussed in detail herein, it should be understood that more complex schemes may be implemented using higher order optimization principles.

These and other objects will become apparent from a detailed review of the drawings and detailed description of the preferred embodiments.

BRIEF DESCRIPTION OF THE DRAWINGS

The invention will now be described with reference to the accompanying drawings, in which.

DETAILED DESCRIPTION OF THE PREFERRED EMBODIMENTS

Figure 1:
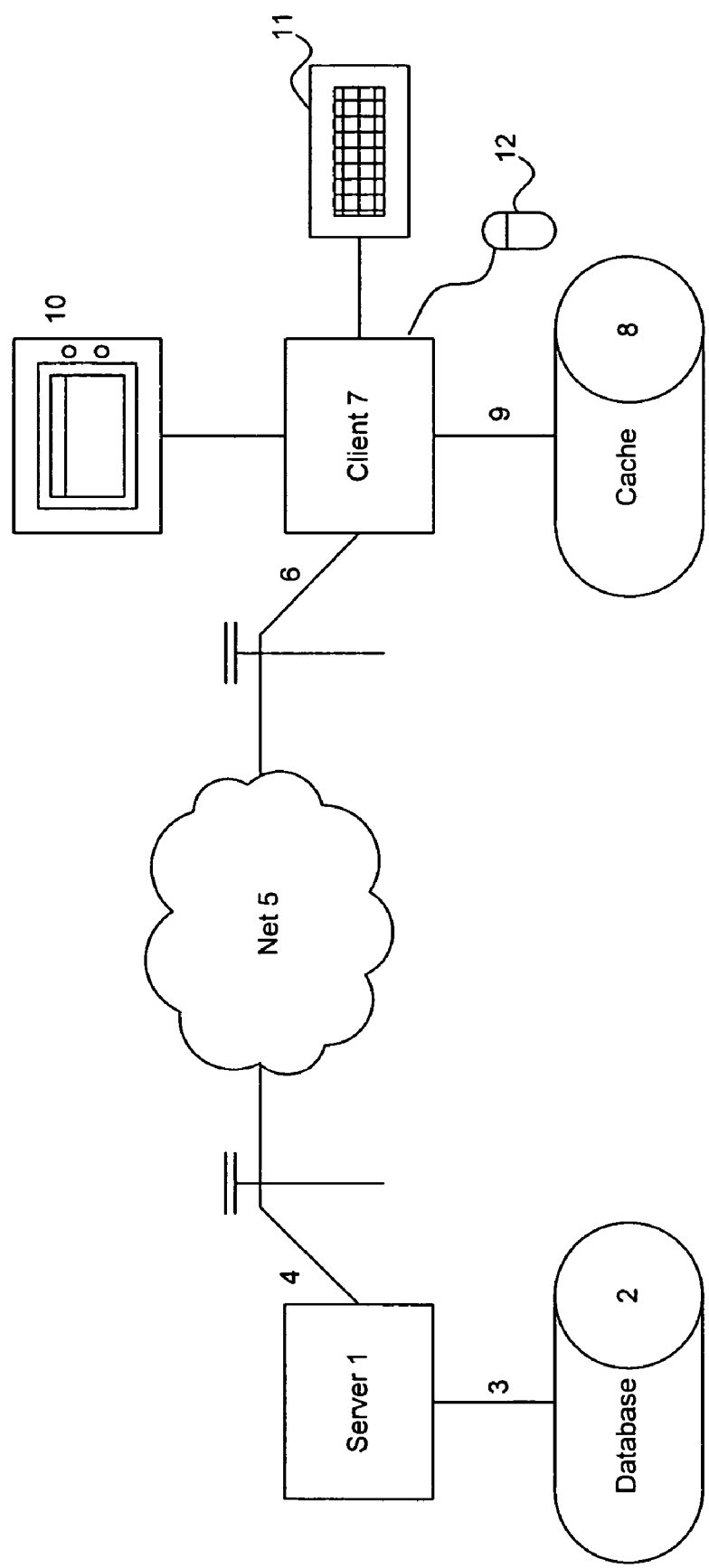
FIG. 1 shows a generic network, having a server and client connected through a public network.

The foregoing and other objects, features and advantages of the present invention will become more readily apparent to those skilled in the art to which the invention pertains upon reference to the following detailed description of one of the best modes for carrying out the invention, when considered in conjunction with the accompanying drawing in which preferred embodiments of the invention are shown and described by way of illustration, and not of limitation, wherein:

FIG. 1 shows a generic network. Typically, the server 1 has a high performance link 3 to the database storage subsystem 2. There may be latency in processing the request from the database storage subsystem 2, especially where the data is stored on optical disks or jukeboxes, magnetic tape, or other relatively slow storage systems. The telecommunications link 4 between the server 1 and the network 5 is also typically high performance, although there are instances where the bandwidth of this link is rate limiting.

The client system 7 has a telecommunications link 6 to the network, which is often rate limiting. Typically, the client side telecommunications link 6 is slower than the server side telecommunications link 4, but the server side telecommunications link 4 may be shared between multiple clients. In order to address the limitations of the client side telecommunications link 6, it is desired to prestore or queue files which may be anticipated to be needed into the cache 8, which is typically a portion of a desktop computer hard drive. In comparison to the telecommunications links 4, 6, the cache 8 is rarely rate limiting.

A user interacts with the client 7 machine using a display 10, keyboard 11 and mouse 12.

When the user defines a search which returns a list 20, a sequence of documents are defined. The user will typically review these in sequence order, or may sort then according to a desire criterion. In either case, the user's review 23 will typically commence with the first element on the list, denominated "1". The caching system will seek to download this file for the user 24. Assuming that the user's review takes longer than the download itself, the caching system will eventually get ahead 26 of the user 25, thus allowing the user to proceed without system latency delays.

If the user jumps ahead 27, 28, the caching system is reset from its prior status 29 to the new position of the user 30, canceling outstanding download requests.

In the field of patent searching, often a user must review each document on the list. Therefore, such shifts or jumps would be uncommon. Further, a professional reviewer would likely procure a system having telecommunications bandwidth sufficient to avoid substantial latencies. Therefore, the preferred embodiment according to the present invention will effectively buffer the database storage subsystem 2, and telecommunications link 4, 6 latencies to allow the user to achieve highest throughput after a short startup delay.

In some instances, the user does not sequentially review records on the list, for example where a cursory examination is being made and decisions are made, for example, on the title of a record. In that case, the user may reset the options of the caching system to disable it, in order to reduce costs or downloading and to reduce the penalty incurred for interrupting ongoing downloads.

Figure 3:
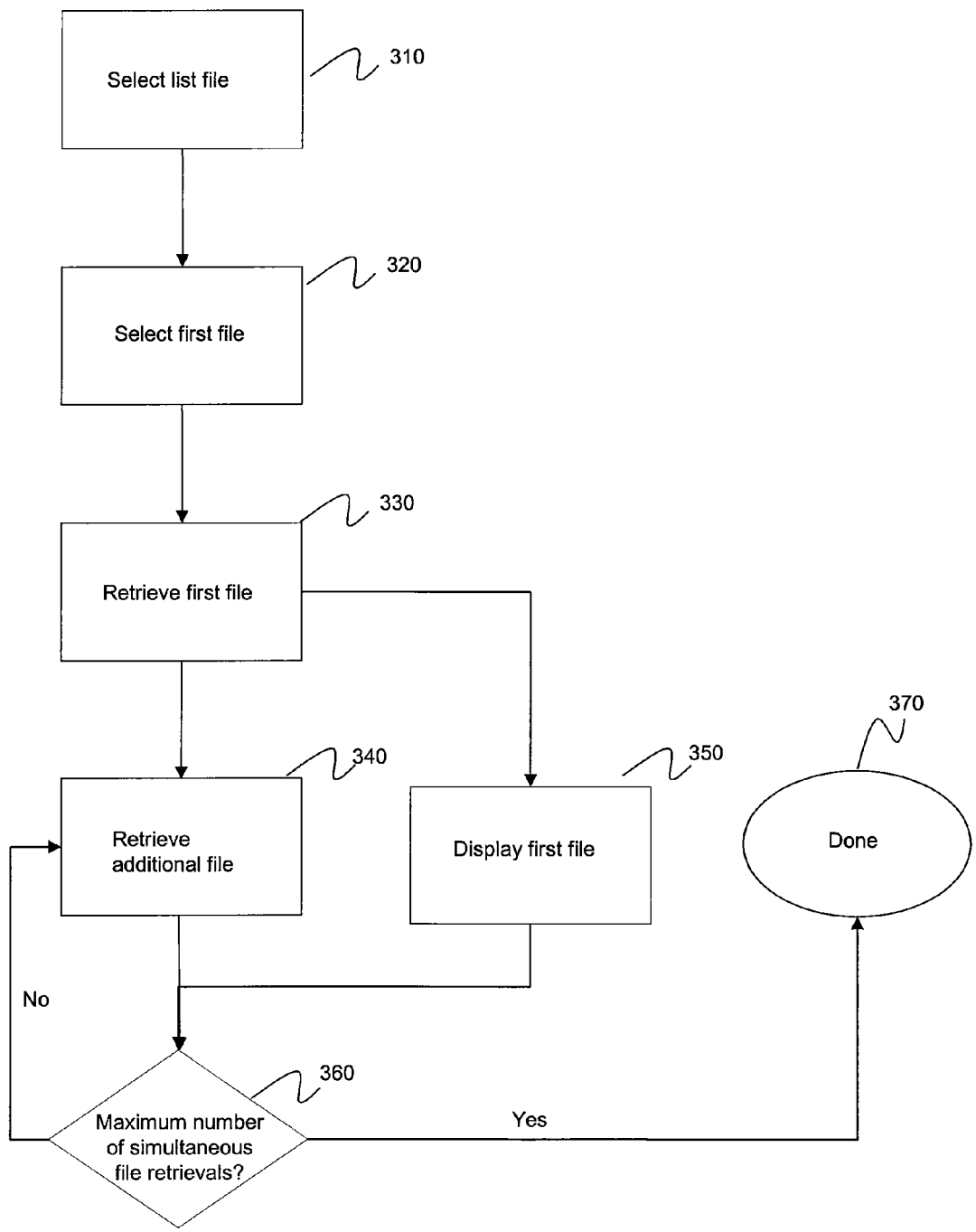
FIG. 3 is a flowchart illustrating steps by which files are retrieved from across a network, in accordance with an embodiment of the present invention.

FIG. 3 is a flowchart 300 illustrating steps by which files are retrieved from across a network, in accordance with an embodiment of the present invention, in accordance with an embodiment of the present invention.

Note that the steps in the flowchart do not necessarily have to occur in the order shown. FIG. 3 is described with reference to the embodiments illustrated in FIGS. 2A- 2C. However, FIG. 3 is not limited to those embodiments.

Figure 2:
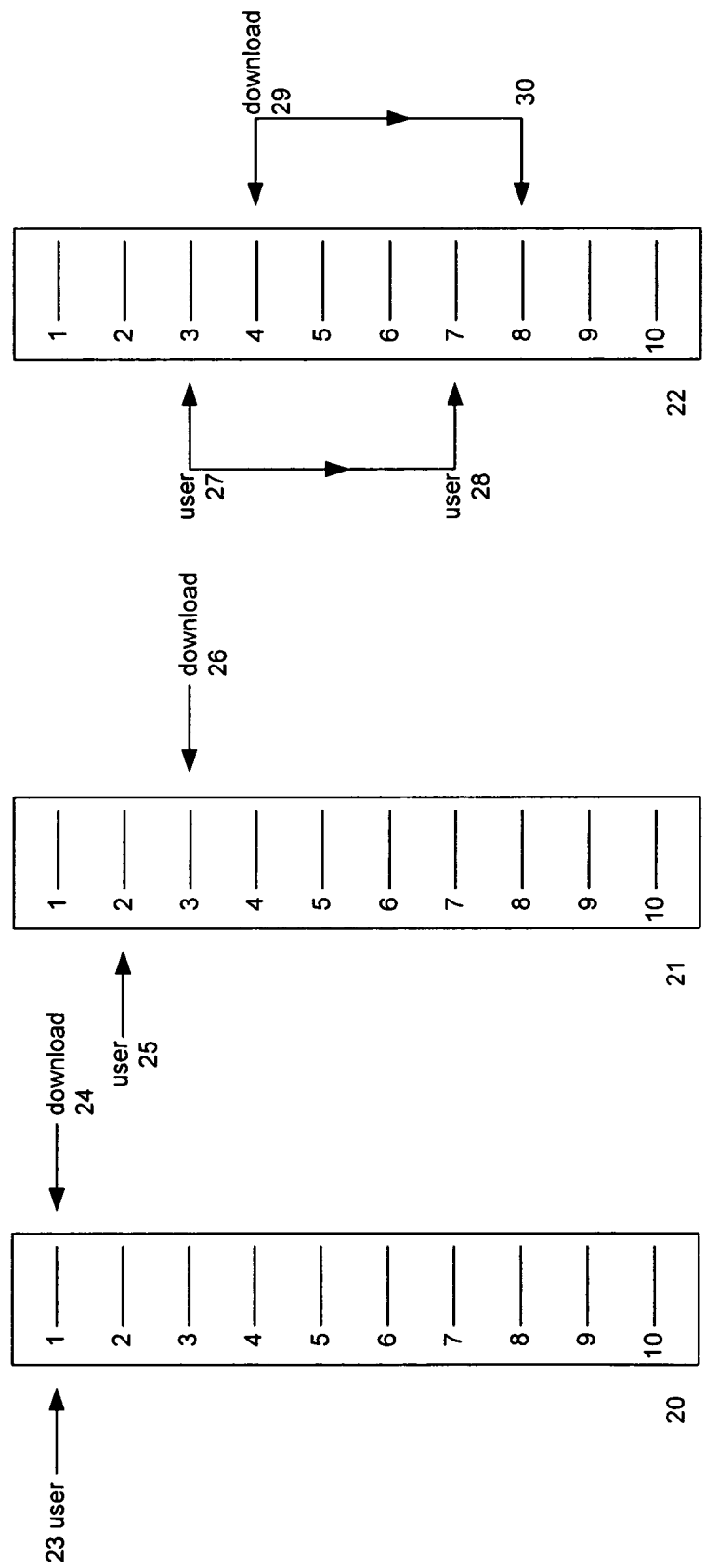
FIGS. 2A, 2B and 2C show a relation of the user review and prequeuing sequence according to the present invention.

The method begins at step 310 where a list file is selected. In an embodiment, the list file contains a list of discrete files that are located across a network, such as the network depicted in FIG. 1. According to an embodiment, a list file such as list 20 depicted in FIG. 2A is selected in step 310. After a list file is selected, control is passed to step 320.

In step 320, a first file in the list file is selected. In an embodiment of the present invention, the first file is selected after the user's review 23 depicted in FIG. 2A. In accordance with an embodiment, the first file in the list file is first element denominated as "1" in FIG. 2A. After a first file is selected, control is passed to step 330.

In step 330, the first file is retrieved in response to selection of the first file in step 320. According to an embodiment, download 24 depicted in FIG. 2A may be performed in step 330. After the first file is retrieved, control is passed to step 340.

In step 340, at least one additional file listed in the list file selected in step 310 is automatically retrieved. In this step, download 26 depicted in FIG. 2B is performed.

In step 350, the first file retrieved in step 330 is displayed. According to an embodiment of the present invention, step 350 occurs after the retrieval of step 330 is completed and while step 340 is being performed. User review 25 depicted in FIG. 2B may occur as a part of step 350.

In step 360 an evaluation is made regarding whether the maximum number of simultaneous file retrievals is occurring. If it is determined that the number of files being retrieved simultaneously is less than a maximum allowable number of simultaneous retrievals, control is passed to step 340. If it is determined that the number of files being retrieved simultaneously is greater than or equal to a maximum allowable number of simultaneous retrievals, then control is passed to step 370.

In step 370, the process ends. In accordance with an embodiment of the invention, outstanding download requests may be canceled in this step, as depicted in FIG. 2C.

The foregoing description of the preferred embodiment of the invention has been presented for purposes of illustration and description and is not intended to be exhaustive or to limit the invention to the precise forms disclosed, since many modifications and variations are possible in light of the above teachings. Some modifications have been described in the specifications, and others may occur to those skilled in the art to which the invention pertains. Therefore, the scope of the invention is to be defined solely by the claims that follow.

What is claimed is:

1. A method of retrieving files from across a network, comprising:
   receiving a search comprising search criteria;
   in response to the received search, displaying a list file containing a list of discrete files that are located across a network, wherein respective formats of at least some of the discrete files vary;
   enabling selection of sort criteria for the list file;
   defining a sequence of the discrete files, wherein the sequence is based upon the search criteria and the sort criteria;
   enabling a selection of a first file in the list file;
   initiating retrieval of the first file in response to the selection of the first file;
   automatically initiating retrieval of at least one additional file listed in the list file, wherein the retrieval of the at least one additional file is based on the defined sequence and includes skipping retrieval of at least one file between a first point in the sequence and a second point in the sequence;
   completing retrieval of the first file;
   displaying the first file while retrieving the at least one additional file, wherein a number of files being retrieved simultaneously is less than a received maximum allowable number of simultaneous retrievals; and
   automatically adjusting the maximum allowable number of simultaneous retrievals based on a throughput across the network.

2. The method of claim 1, further comprising:
   caching retrieved files, wherein a number of file retrievals automatically initiated is less than a cache size.

3. The method of claim 1, further comprising:
receiving a selection of a second file in the list file; and
canceling an uncompleted file retrieval that was automatically initiated.

4. The method of claim 3, further comprising:
displaying the second file while retrieving at least one file listed in the list file.

5. The method of claim 2 further comprising:
receiving the cache size.

6. A browser, comprising:
a memory configured to store modules, comprising:
a first logical module to receive a search comprising search criteria,
a second logical module to display a list file in response to the received search, wherein the list file contains a list of discrete files that are located across a network, wherein respective formats of at least some of the discrete files vary,
a third logical module to enable selection of sort criteria for the list file,
a fourth logical module to define a sequence of discrete files, wherein the sequence is based upon the search criteria and the sort criteria,
a fifth logical module to enable selection of a first file in the list file,
a sixth logical module to initiate retrieval of the first file in response to the selection of the first file,
a seventh logical module to automatically initiate retrieval of at least one additional file listed in the list file, wherein the retrieval of the at least one additional file is based on the defined sequence and includes skipping retrieval of at least one file between a first point in the sequence and a second point in the sequence,
an eighth logical module to complete retrieval of the first file,
a ninth logical module to display the first file while retrieving the at least one additional file, wherein a number of files being retrieved simultaneously is less than a received maximum allowable number of simultaneous retrievals, and
a tenth logical module to automatically adjust the maximum allowable number of simultaneous retrievals based on a throughput across the network: and
one or more processors configured to process the modules.

7. The browser of claim 6, further comprising:
an eleventh logical module to cache retrieved files, wherein a number of file retrievals automatically initiated is less than a cache size.

8. The browser of claim 6, further comprising:
an eleventh logical module to receive a selection of a second file in the list file; and
a twelfth logical module to cancel an uncompleted file retrieval that was automatically initiated.

9. The browser of claim 8, further comprising:
a thirteenth logical module to display the second file while retrieving at least one file listed in the list file.

10. The browser of claim 7, further comprising:
a twelfth logical module to receive the cache size.

11. An article of manufacture including a non-transitory computer-readable medium having instructions stored thereon, that in response to execution by a computing device, cause the computing device to perform operations comprising:
receiving a search comprising search criteria;
in response to the received search, displaying a list file containing a list of discrete files that are located across a network, wherein respective formats of at least some of the discrete files vary;
enabling selection of a sort criteria for the list file;
defining a sequence of discrete files, wherein the sequence is based upon the search criteria and the sort criteria;
enabling a selection of a first file in the list file;
initiating retrieval of the first file in response to the selection of the first file;
automatically initiating retrieval of at least one additional file listed in the list file, wherein the retrieval of the at least one additional file is based on the defined sequence and includes skipping retrieval of at least one file between a first point in the sequence and a second point in the sequence;
completing retrieval of the first file;
displaying the first file while retrieving the at least one additional file, wherein a number of files retrieved simultaneously is less than a received maximum allowable number of simultaneous retrievals; and
automatically adjusting the maximum allowable number of simultaneous retrievals based on a throughput across the network.

12. The article of manufacture of claim 11, the operations further comprising:
caching retrieved files, wherein a number of file retrievals automatically initiated is less than a cache size.

13. The article of manufacture of claim 11, the operations further comprising:
receiving a selection of a second file in the list file; and
canceling an uncompleted file retrieval that was automatically initiated.

14. The article of manufacture of claim 13, the operations further comprising:
displaying the second file while retrieving at least one file listed in the list file.

15. The article of manufacture of claim 12, the operations further comprising:
receiving the cache size.

* * * * *

UNITED STATES PATENT AND TRADEMARK OFFICE
CERTIFICATE OF CORRECTION

PATENT NO.       : 8,204,962 B2
APPLICATION NO.  : 11/362942
DATED            : June 19, 2012
INVENTOR(S)      : Young et al.

It is certified that error appears in the above-identified patent and that said Letters Patent is hereby corrected as shown below:

IN THE SPECIFICATIONS:

In Column 1, Line 46, delete "find" and insert -- and --, therefor.

In Column 4, Line 43, delete "network: and" and insert -- network. --, therefor.

IN THE CLAIMS:

In Column 7, Line 8, in Claim 5, delete "2" and insert -- 2, --, therefor.

In Column 7, Line 43, in Claim 6, delete "network: and" and insert -- network; and --, therefor.

Signed and Sealed this
Sixteenth Day of October, 2012

David J. Kappos
*Director of the United States Patent and Trademark Office*